United States Patent [19]
Washburn, Jr.

[11] Patent Number: 5,203,108
[45] Date of Patent: Apr. 20, 1993

[54] METHOD AND DEVICE FOR HEAT KILLING INSECTS IN BULK PRODUCE CONTAINERS

[76] Inventor: Martin W. Washburn, Jr., R.R. 1, Box 313A, Morgan Hill, Calif. 95037

[21] Appl. No.: 708,358

[22] Filed: May 31, 1991

[51] Int. Cl.$^5$ .................................................. A01M 19/00
[52] U.S. Cl. ..................................... 43/130; 43/124; 43/132.1
[58] Field of Search ........................ 43/124, 130, 132.1

[56] References Cited

U.S. PATENT DOCUMENTS

| | | | |
|---|---|---|---|
| 1,234,214 | 7/1917 | Reynolds | 43/132.1 |
| 1,948,228 | 2/1934 | Urban | 43/132.1 |
| 4,716,676 | 1/1988 | Imagawa | 43/130 |
| 4,961,283 | 10/1990 | Forbes | 43/124 |

OTHER PUBLICATIONS

"Section III Treatment Procedures" Part 15 High Temperature Forced Air in *PPQ Treatment Manual.*
"Section IV, Treatment Facilities" in Section IV, part 6, *PPQ Treatment Manual.*
"Papaya Disinfestation Treatments A Report on Current Status, Future Actions, and Resource Requirements" by J. Armstrong, et al., (May 30, 1989).
"Engineering Considerations of Heat Transfer in Quarantine Treatments for Fruits" by J. J. Gaffney, U.S.-D.A., ARS, Gainesville, Florida, (Nov. 24, (1989).
"High Temperature Forced-Air Research Facility for Heating Fruits for Insect Quarantine Treatments" by J. J. Gaffney and J. W. Armstrong, in *Journal of Economic Entomology,* (1989).
"High Temperature Forced-Air Quarantine Treatment for Papayas Infested with Tephritid Fruit Flies, (Diptera: Tephritidae)" by J. W. Armstrong, et al., in Journal of Economic Entomology, (1988).
"Advances in Commercial Dry Heat Disinfestation of Papaya" by P. M. Winkleman and M. R. Williamson in *American Society of Agricultural Engineers,* International Summer Meeting, paper number 90-6616 (Jun. 24-Jun. 27, 1990).

Primary Examiner—Kurt C. Rowan
Attorney, Agent, or Firm—Cooley Godward Castro Huddleson & Tatum

[57] ABSTRACT

An apparatus for killing insects in produce, which comprises an outer container; means for dividing a space enclosed by the outer container into first and second internal chambers; means for supporting a plurality of bulk produce bins in the first internal chamber; first and second air passage means for selectively allowing passage of air between the first internal chamber and the second internal chamber; means for circulating air in the second internal chamber successively through one of the air passage means, the first internal chamber, the other of the air passage means, and back into the second internal chamber; and means for heating the circulating air.

28 Claims, 2 Drawing Sheets

FIG. 1

METHOD AND DEVICE FOR HEAT KILLING INSECTS IN BULK PRODUCE CONTAINERS

TECHNICAL FIELD

This invention is directed to methods and devices that kill insects in bulk food products, particularly for shipment from a quarantined geographical area infested with an economically important insect pest to an uninfested area.

BACKGROUND

One of the major advances of the Twentieth Century agriculture has been the improved transportation of produce and other foods from one geographical region to another. Such transportation has provided, for example, fresh fruits and vegetables during winter months by transporting such materials grown in the southern hemisphere to the northern hemisphere and vice versa. However, this increase in transportation of food products has also led to the introduction of insect pests from one area of the world to other areas where the natural predators of that pest do not exist. The economic dangers of importing distant pests into a valuable agricultural region, often through the importation of produce and other food substances, are well known.

The U.S. Department of Agriculture regulates transportation of agricultural products into the United States and from infested to uninfested areas within the United States. In a specific example of such regulation, quarantine regulations require treatment of papaya after harvest for shipment from Hawaii to the U.S. mainland or Japan. Quarantine treatments are used to disinfest the fruit of Mediterranean Fruit Fly, *Ceratitis capitata* (Wiedemann); Melon Fly, *Dacus cucurbitae* Coquillett; and Oriental Fruit Fly, *D. dorsalis* (Hendel).

Prior to 1984, ethylene dibromide (EDB) fumigation was the principal treatment for quarantined fruit. However, the U.S. Environmental Protection Agency discontinued the registration for such use after the harvest in September of 1984 because of concerns relating to carcinogenicity of EDB. EDB was the only quarantine treatment for papaya (and numerous other fruits) in use at that time. The standard treatment consisted of a 20-minute immersion of fruit into 49° C. water for decay control after harvest, followed by an 8 g/m$^3$ EDB fumigation for 2 hours.

Following the ban on EDB fumigation, two high-temperature treatments were approved for disinfestation of papayas and other fruits. One quarantine treatment is a 2-stage hot-water immersion that provides quarantine security only against fruit fly eggs (Couey and Chew, *J. Econ. Entomol.* (1986) 79:887–90) This treatment requires harvesting a fruit that is less than ¼ ripe, before the papayas become susceptible to fruit fly infestation. Harvest at this ripeness prevents potential larval infestations that cannot be controlled by the 2-stage hot-water immersion, but the fruit is less than optional at this stage of ripeness.

The other quarantine treatment is a "quick run-up" vapor heat treatment first described by Baylock and Kozuma, "Special Report No. 7, Fruit Fly Investigations in Hawaii," U.S. Department of Agriculture, Entomology Research Branch, Honolulu, Hawaii (1954). This process consists of a short preheating (preconditioning) period using hot air at 40–60 percent relative humidity to a specified temperature. The fruit pulp is then gradually warmed to 47.2° C. (117° F.) using high-temperature air saturated with water vapor. The "quick run-up" treatment does not require fruit selection at an early stage because it is effective against both the egg and larval stages of *C. capitata, D. cucurbitae,* and *D. dorsalis.* Unfortunately, both the 2-stage hot-water immersion and the "quick run-up" vapor heat treatments can cause damage to papayas and other fruits, even under precisely controlled conditions.

More recently, proposals have been set forth for steam treatment of fruit to kill insects. One such apparatus is described in U.S. Pat. No. 4,716,676, in which steam is injected into the apparatus and a humidity of 90–100 percent is maintained during the treatment process. However, this apparatus is expensive and further requires exposing produce to simultaneous heat and humidity much in the same manner as the vapor heat treatment described above.

In response to these problems of fruit damage, the U.S. Department of Agriculture has developed a high-temperature, forced-air (HTFA) quarantine treatment for papayas infested with various fruit flies and other insects. See, for example, PPQ Treatment Manual, USDA, especially Sec. III, "Treatment Procedures," Part 15, "High Temperature Forced Air," and Sec. IV, "Treatment Facilities," Part 6, "High Temperature Forced Air," (version of March, 1990); see also Gaffney and Armstrong, "High Temperature Forced-Air Research Facility for Heating Fruits for Insect Quarantine Treatments," *J. Economic Entomology* (1990) 83: 1959–1964; Armstrong, et al., "High-Temperature Forced Air Quarantine Treatment for Papayas Infested with Tephritid Fruit Flies," *J. Economic Entomoloqy* (1989) 82: 1667–1674; all of which are herein incorporated by reference. In this process fruit is treated with hot air until the fruit center reaches a temperature of 47.2° C. (117° F.) to 48.8° C. (120° F.) for periods of 2 to 7 hours. In some treatments, heating occurs in set temperature stages, while in other treatments a single temperature sufficient to raise the fruit center temperature to the desired limit is used. Using these treatment conditions with a relative humidity of 40–60 percent, no fruit damage was seen. When the fruit center temperatures reached the desired level, the fruit was immediately hydro-cooled until the fruit centers were 30° C. or below. Phytotoxicity tests demonstrated that the HTFA treatment was not detrimental to fruit quality. Survival tests indicated that the HTFA treatment was sufficient to disinfest fruit such as papayas from *C. capitaty, D. cucurbitae,* and *D. dorsalis* infestations.

Although this process has proven useful in providing a treatment of papaya and other easily damaged fruit, disadvantages still exist, particularly with regard to commercial application of the process. The treatment has not previously been amenable to bulk processing of produce. For example, a recent paper by Winkelman and Williamson presented at the 1990 International Summer Meeting sponsored by the American Society of Agricultural Engineers (June 24–27, 1990), which discusses the HTFA process and suggests improvements, indicates that fruit loaded in standard bulk bins showed a relatively large difference in final temperatures in fruit centers for interior vs. exterior fruit in bulk bins. This paper, as have previous papers including the original USDA proposal, recommends shallow, single-layer trays of fruit. However, preparing fruit in single layers is time and labor intensive and does not lend itself to commercial applications. Accordingly, methods and apparatuses for killing insects using the HTFA system as modified to allow for bulk processing are highly desirable.

SUMMARY OF THE INVENTION

Accordingly, it is an object of this invention to provide a process for bulk deinfestation of produce using the recent HTFA process developed by the Department of Agriculture.

It is a further object of this invention to provide such an apparatus and method that lends itself not only to use of bulk containers, but to processing of multiple bulk containers at the same time.

These and other objects of the invention have been accomplished by providing an apparatus for killing insects in produce, which comprises an outer container; means for dividing a space enclosed by the outer container into first and second internal chambers; means for supporting a plurality of bulk produce bins in the first internal chamber; first and second air passage means for selectively allowing passage of air between the first internal chamber and the second internal chamber; means for circulating air in the second internal chamber successively through one of the air passage means, the first internal chamber, the other of the air passage means, and back into the second internal chamber; and means for heating the circulating air.

BRIEF DESCRIPTION OF THE DRAWINGS

The present invention will be better understood by reference to the following description of specific embodiments when considered in conjunction with the drawings that form part of this specification, wherein.

DESCRIPTION OF SPECIFIC EMBODIMENTS

The present invention provides an apparatus and a method for killing insects in bulk produce. The apparatus allows use of standard sized bulk containers that can be moved using a forklift and therefore lends itself to large-scale operations. Handling of individual fruit and preparation of fruit in single layers is avoided, as is treatment with steam and water vapor, which in the past have damaged fruit.

The apparatus comprises an outer container that is divided into two internal chambers. The outer container walls are sufficiently airtight to allow air circulation between the two chambers without significant loss of internal air. At least one and preferably a plurality of bulk produce bins can be loaded into the first internal chamber. Air passages are provided between the first and second internal chambers to allow for circulation of air between the two chambers. The air passages are located and the first chamber is configured so that all or most of the circulating air passes through the bulk bins rather than around them. A fan or other means for circulating air is provided in the second chamber along with a heating source so that the circulating air can be raised to and maintained at the desired temperature. Specific embodiments that allow control of air flow are described in detail below.

Figure 1:
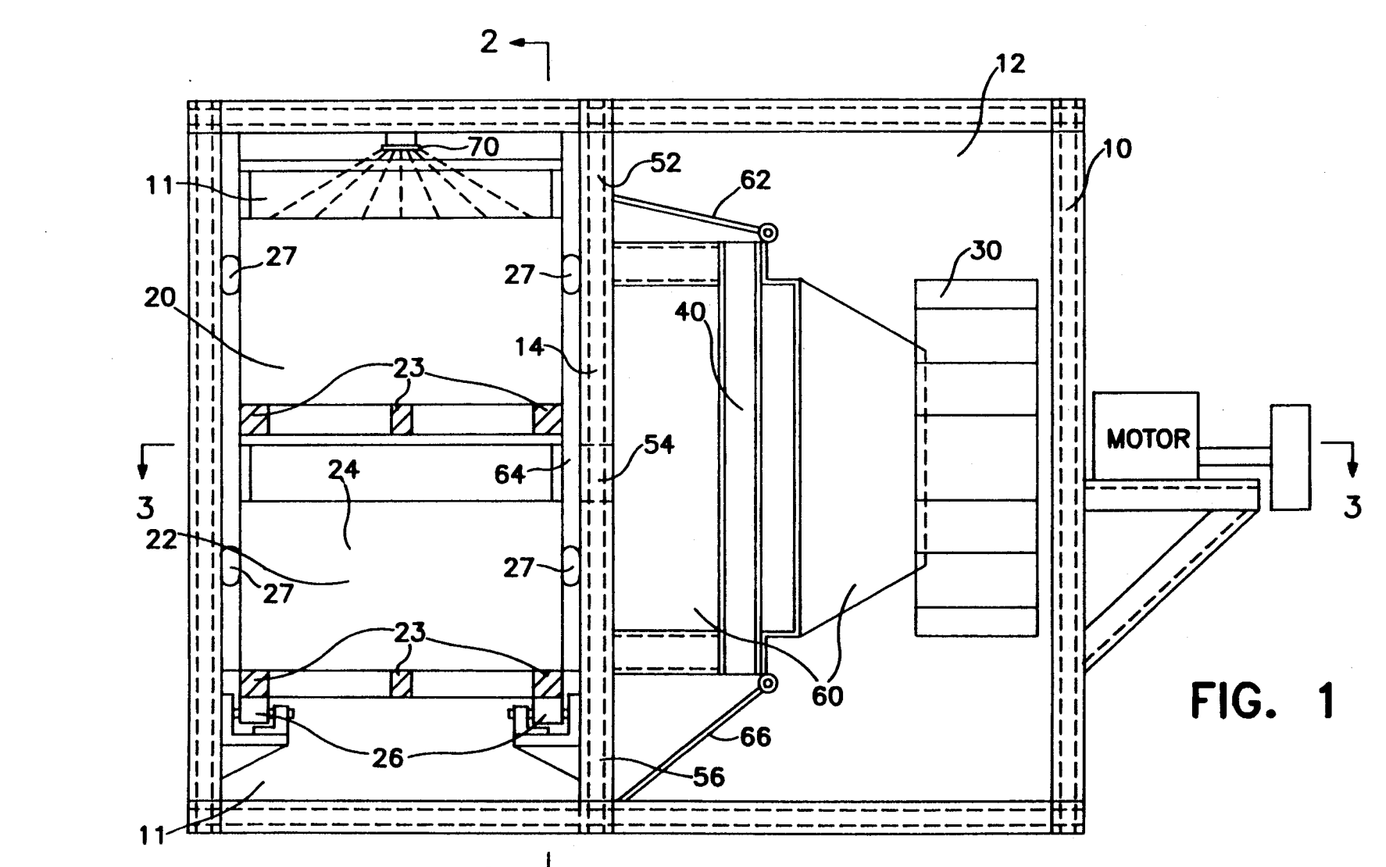
FIG. 1 is a vertical cross-section of an apparatus of the invention.

The method and apparatus can be easily understood by reference to the Figures, in which the same reference numerals are used in different views of the same embodiment. FIG. 1 shows a cross-sectional view of one embodiment of the invention. An external container 10 isolates two internal chambers from the external environment. A first internal chamber 11 located on the left side of the Figure will contain the produce. The heating and air-circulating components are located in second internal chamber 12, which is on the right side of the apparatus as shown. These two internal chambers are separated from each other by dividing wall 14 which limits and controls flow of air between the two chambers.

Two produce bins are visible in chamber 11. In the embodiment shown, an upper produce bin 20 is shown stacked on a lower produce bin 22. As illustrated for produce bin 22, the bin comprises a supporting portion 23, in this case shown in cross-section as a fork-lift platform, and a containing portion 24 that will hold the produce. An overhead support 25 is also visible in this embodiment so that upper produce bin 20 can be stacked on lower produce bin 22 without damaging the produce.

The shape of an individual produce bin will vary with the type of produce being treated. In most cases, there is no need to redesign standard industrial bins, as the apparatus of the invention can be designed to fit the bins, as described below. However, the bins will generally be simple containers open at the top so that produce can be loaded into and removed from the bins, and with a mesh type of bottom to allow for the passage of air through the bin. A simple plastic barrier material such as is used in road construction barriers has been found to be satisfactory for the bottom mesh. In preferred embodiments, the bins will hold multiple layers of produce. However, the apparatus will also work with trays holding single layers of produce. Such embodiments are not preferred as they require significant additional labor costs and handling of the produce.

Figure 2:
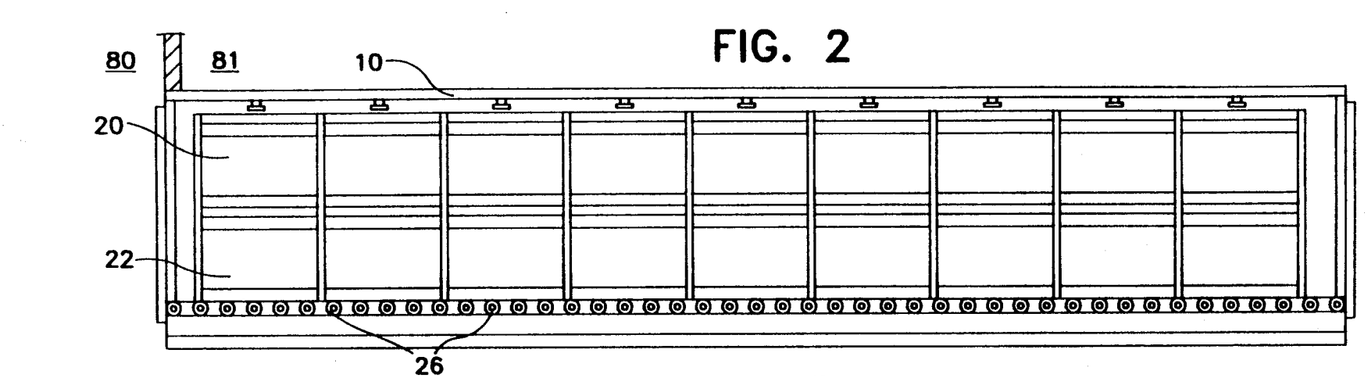
FIG. 2 is a vertical elevation of an apparatus of the invention taken along line A—A of FIG. 1.
Figure 3:
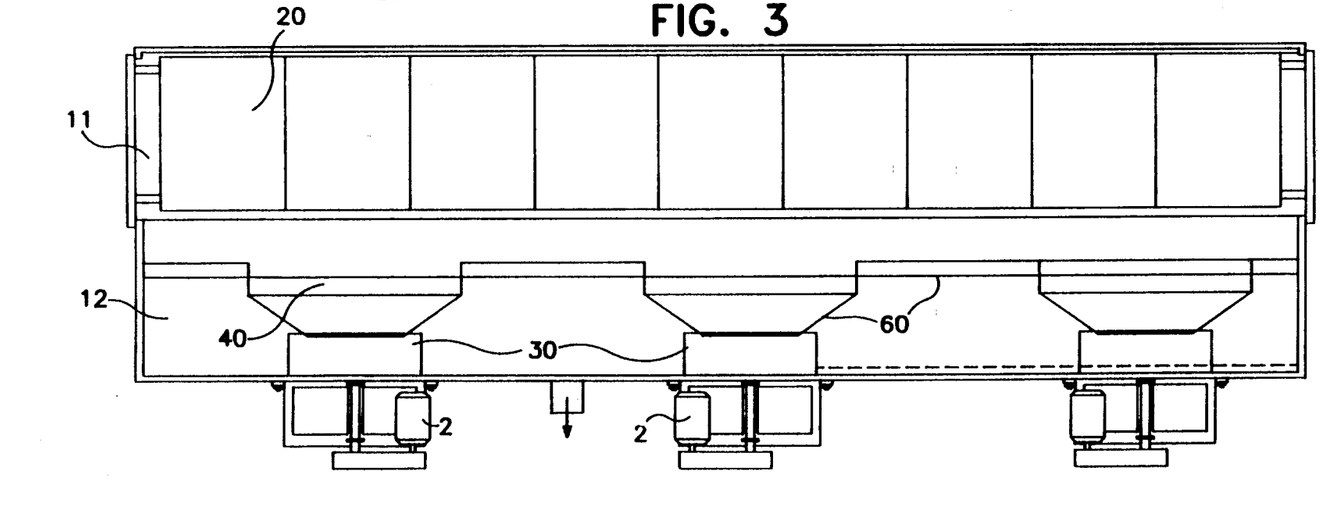
FIG. 3 is a plan view of an apparatus of the invention taken along line B—B of FIG. 1.

In the embodiment shown in the Figures, forklift platform 23 rests on a roller conveyer 26, which functions to allow produce bins to be moved into and out of chamber 11 and to provide support while the bins are in the chamber. Conveyer 26, along with flexible tube-type gaskets 27, acts to block passage of air around the sides of the produce bins, so that air passes substantially through the produce bins rather than around them. Such blocking of undesirable air passage around the bins is preferred in an apparatus of the invention, although the technique used to block air from passing around rather than through the produce can vary from apparatus to apparatus.

The air that passes through the produce is circulated by means of fan 30 in chamber 12. The output of this fan is connected to plenum 60 in order to direct the output air under pressure to the desired location. Air in plenum 60 passes in this embodiment over a heating element or elements, shown as steam coils 40. However, this heating element can be located anywhere in container 10, preferably in chamber 12, since all of the air inside container 10 circulates through the apparatus. In addition, the shape of the heating element is immaterial, so that reference to a steam "coil" does not limit a steam heating element to that particular shape. In preferred embodiments, the heating element is a hot surface (e.g., radiator or metal piping), with a heat source such as hot water, steam, a flame, or electric heat actually supplying the heat energy. This allows better control of heating and isolates the circulating air from potential pollution by the energy source (e.g., waste products from a flame).

Circulation of air is controlled by air passageways located in wall 14 between chamber 11 and chamber 12. In this embodiment, three air passageways are shown: upper air passageway 52, middle air passageway 54, and lower air passageway 56. Air is directed to at least one of these passageways by plenum 60. However, in preferred embodiments dampers are provided so that air can be circulated in different directions within container 10. In the embodiment shown in the Figures, three dampers are shown. Movable dampers 62 and 66 control air passage through air passageways 52 and 56, respectively. Control of these dampers can be provided external to container 10 by control rods or wires (not shown), or can be mechanized for remote control. In the embodiment shown in the figures, a removable damper 64 that cannot be controlled from the outside is shown located in air passageway 54. This is an optional air passageway and need not be provided in preferred embodiments.

Damper 62 and 66 are shown in FIG. 1 moved into position so that air passing through plenum 60 is forced from chamber 12 into chamber 11 through passageway 56. Air then returns into chamber 12 through passageway 52. By moving these two dampers to their alternate positions, air can be forced through the produce in the opposite direction.

A water spray head 70 is also shown in FIG. 1, although such a spray head is not required. In the embodiment as shown, water can be sprayed on the produce to lower the produce temperature immediately after heat treatment. However, it is also possible to move the bulk produce bins to another location for cooling.

FIG. 2 is an elevation taken along line A—A of FIG. 1. Multiple produce bins 20 and 22 are visible in this view. The use of multiple rollers 26 in a conveyer fashion to support and move bulk produce bins through the apparatus is readily apparent in this Figure. Access doors 16 and 18 allow entry and egress of produce bins. For example, a forklift can be used to move a stack of 2 produce bulk bins into chamber 11 through access door 16, after which they can be moved along rollers 26 to the opposite end of the chamber. Additional produce bins can then be loaded into chamber 11 until the chamber is substantially filled.

It is preferred that the produce bins be either in contact with each other or located sufficiently close to each other so that essentially all of the airflow in chamber 11 occurs through the produce bins and not between the bins. This can be readily accomplished by sizing the chamber to hold a specified, pre-determined number of produce bins with little free space. Compressible gaskets or other baffles can be provided to reduce air flow between adjacent bins. Sufficient air space is provided at the top and bottom of chamber 11 to allow access of air to the produce bins themselves. The apparatus can be operated with fewer than the maximum number of bins by closing dampers that control air circulation through unused space and inserting a moveable baffle into the produce chamber between the end produce bin and the unused bin space.

In operation, the apparatus shown in FIGS. 1 and 2 typically is located in a building such that exterior door 16 opens into an insect infested environment 80, while interior door 18 opens into the interior 81 of the building, commonly known as a quarantine area, which is maintained insect free. The building is typically a packing plant or other produce-handling operation that prepares the produce for shipment.

FIG. 3 is a plan view of the same embodiment shown in FIGS. 1 and 2. In this plan view, the use of a common plenum 60 with different fan units 30 and heating units 40 is shown. Motor, fans, and heating elements are selected to provide sufficient air flow and heat to meet USDA or other standard treatment requirements.

The general operating characteristics of the apparatus are described above. The method by which this apparatus works is to recirculate air in a closed container between a compartment that contains the produce and a compartment that contains the fan or other means for circulating and (normally) a heating element to maintain desired temperature. Circulation is provided so that essentially all of the recirculating air passes through the bulk produce containers, in contrast to previous systems that have placed the bulk containers in a relatively large internal chamber. In such chambers, circulation of air has not achieved the desirable results of the present inventions.

As a consequence of forcing air through the randomly packed produce, a pressure differential of about 1 inch of mercury is maintained across the produce bins. This pressure differential has the beneficial effect of minimizing temperature gradients within the treated produce and producing uniformity of temperature.

In addition to the general characteristics described above, a number of additional features are present in preferred embodiments.

For example, the outer container is generally designed to be insect proof. This is particularly important if, as shown in FIG. 2, a portion of the container extends into a space, such as the interior of a packing building, which is required to be insect proof for the purposes of maintaining a quarantine. Additionally, the container can be maintained in an airtight and insulated fashion so as to reduce heat loss either by convection or conduction, thereby increasing the efficiency of operation.

There is no limit on the produce that can be treated with an apparatus of the invention. Any fresh fruit or vegetable that is subject to insect infestation and quarantine can be treated in an apparatus of the invention. Typical fruits include citrus of all types (especially oranges), apples, papayas, mangoes, pitaya (a type of cactus fruit), and melons. Treatment of tropical fruits is preferred, as these represent a major source of pest insects that could infest other parts of the world. Typical vegetables include sweet peppers (green and other colors), hot peppers, and ripe tomatoes.

Although the invention can be carried out with a single bulk produce bin, it is preferred that the apparatus be designed to contain a large number of bins, as shown in the Figures, so that produce can be heat-treated in a rapid and efficient manner.

The produce bins in which the produce is located can be any standard produce bin. A typical produce bin is about 2-3 feet high and about 3-5 feet square, although other shapes are possible. FIGS. 1-3 are scale drawings, and the dimensions of a typical produce bin used for papaya can be seen in these Figures. It will be recognized by those skilled in the art that produce bins for different types of produce will be sized differently, due to the differing sizes of the individual fruits and vegetables and their susceptibility to bruising and other damage caused by stacking in a produce bin.

The bottoms of the produce bins themselves will normally be made of open material that is sized so that the produce cannot escape through the openings but which provides sufficient open space so that air can readily pass through the bin and the produce contained therein. A typical construction is of wooden slats or plastic mesh. The material should be strong enough to hold the weight of the produce without significant deflection and smooth enough to avoid leaving marks on the fruit.

A produce bin that contains an integral forklift platform represents one embodiment of a produce bin that can readily be used with the present invention. However, the produce bin can consistent of a separate portion that contains the produce which rests on a forklift platform. Any overhead supports that are desirable for stacking one produce bin on another, as shown in the Figures, can either be integral parts of the produce bin or can be frame members that surround individual produces bins solely for the purpose of stacking. Alternatively, instead of providing a single roller conveyor or other support means as shown in the Figures and stacking one bin on top of the other, two or more roller conveyors or other support means can be provided so that multiple bins can be stacked in the apparatus without requiring the weight of one bin to be supported by another.

A key feature of the present invention, as previously mentioned, is that the circulation of air takes place so that substantially all of the recirculating air passes through the produce bins and not around the sides of the produce bin during the recirculation operation. In addition to providing supports that cut off passage of air along the sides of the bulk produce bins and packing the bins close to each other so that air cannot pass between them (both of which are previously described), it is also possible to provide baffles, either fixed or moveable, that extend from the side of the first chamber into the chamber and contact the bins along their sides or at other locations so that air is blocked from passing around the bins. For example, such baffles may be present at the doors so that when the doors are closed, the baffles contact the ends of the bins and prevent air from passing around the ends of the bins at each end of the row of bins and the first chamber.

On the other hand, it is not necessary to completely block passage of air from flowing around the bins. It is merely required that a substantial portion of the air pass through the bins so that the produce will be sufficiently heated. If a large amount of air is allowed to circulate around the bins, the heating operation will be inefficient in the center of the bins relative to that which occurs at the outer sides and edges of the bins, thereby producing an unacceptable temperature gradient. Produce at the edges of the bins will be overheated while produce centers may not reach the necessary temperature for killing insects and insects larvae and eggs. As used herein, "effectively" or "substantially," when referring to passage of air through the bins, preferably means that at least 80 percent by volume (more preferably at least 90 percent) of the recirculating air passes through the bins rather than around the edges of the bins. More preferably, "substantially all of the air" means at least 95 percent, most preferably at least 98 percent, of the air passes through the bins. As is understandable in the name of efficiency, if 100 percent of the air passes through the bins rather than around the edges, this represents the most desirable situation.

The rate of flow is not critical, although it is desirable to have a linear flow rate of at least 1.6 m/sec, more preferably at least 2.3, and most preferably at least 3.0 m/sec. This can be maintained by sizing the fans or other circulating means to provide a pressure differential of at least ½ inch, preferably at least 1 inch, and more preferably at least 1 ½ inch of mercury.

As noted above, the apparatus is generally prepared with an entrance door at one end and an exit door at the other for moving the produce through the apparatus, although other shapes are possible. However, it is also possible (although not as desirable) to provide a single entrance/exit door for introducing produce into the treatment chamber. When such an apparatus is used in a quarantine area, however, other means will have to be provided in order to prevent transportation of insects between insect-infested and insect-free locations.

The capacity of the heating elements will vary depending on the weight, size, and initial temperature of produce being treated and other operations that will vary with the individual site and apparatus, such as outside temperature, presence of sun or shade, insulation of the outer container, and rate of air circulation. Standard engineering of heat transfer can be used to determine the size of the required heating elements. A typical heating element for the apparatus as shown in FIGS. 1–3 has a capacity of 230,000 BTU/hr. In this embodiment coils are installed in groups of six, hence the heating elements will supply 1,300,000 BTU/hr. Some empirical adjustment of the amount of heat being supplied will be necessary, although in a typical operation one merely follows the guidelines of the U.S. Department of Agriculture (or other guidelines for quarantine operation) while controlling the temperature of the circulating air via a thermostat connected to the heating element or in the air stream.

The insect-killing operation of the invention typically takes places at a relatively low humidity, normally below 75 percent, preferably below 70 percent, and more preferably in the 40–50 percent range. Since the produce normally contains moisture and since the air is recirculated within the closed apparatus of the invention, humidity control is not normally required, as an equilibrium condition quickly occurs. However, it is possible to provide for humidity control using standard operations in the apparatus, typically by including a humidifier, a dehumidifier, or both in the second internal chamber of the apparatus or by blending with filtered outside air. In preferred embodiments, the apparatus is not provided with any means for controlling humidity.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An apparatus for killing insects in produce, which comprises:

an outer container;

means for dividing a space enclosed by said outer container into first and second internal chambers;

first and second air passage means for allowing passage of air between said first internal chamber and said second internal chamber;

means for circulating air from said second internal chamber successively through one of said air passage means, said first internal chamber, the other of said air passage means, and back into said second internal chamber;

means for heating said circulating air while maintaining relative humidity in said first internal chamber below 75%; and means for supporting at least one bulk produce bin in said first internal chamber so that sides of said bin contact surfaces of said first internal chamber or surfaces of additional bins in said chamber, wherein contacting surfaces and bin sides block passage of air through said first internal chamber expect for passage through said bin or bins in said first internal chamber.

2. The apparatus of claim 1, wherein said means for supporting supports a plurality of bulk produce bins.

3. The apparatus of claim 1, wherein said means for circulating comprises a fan and a plenum connecting the output of said fan to at least one of said air passage means.

4. The apparatus of claim 3, wherein said means for circulating further comprises at least one damper which in a first position allows air from said plenum to enter said first internal chamber through one of said air passage means and in a second position allows air from said first internal chamber to re-enter said second internal chamber.

5. The apparatus of claim 4, wherein said means for circulating comprises a damper operably associated with each of said first and second air passage means which in a first position allows air from said plenum to enter said first internal chamber through said associated air passage means and in a second position allows air from said first internal chamber to re-enter said second internal chamber through said associated air passage means.

6. The apparatus of claim 1, wherein said first air passage means is located in an upper portion of said means for dividing and said second air passage means is located in a lower portion of said means for dividing.

7. The apparatus of claim 1, wherein said air passage means is located in said means for dividing so that air from said second internal chamber, upon entering said first internal chamber through one of said air passage means when a produce bin is supported by said means for supporting, passes through said produce bin and returns to said second internal chamber through said second air passage means.

8. The apparatus of claim 3, wherein said means for heating is a heated surface located in said plenum.

9. The apparatus of claim 8, wherein said means for heating is a steam coil.

10. The apparatus of claim 1, wherein said bulk produce bin comprises means for containing said produce in multiple layers, air access means for allowing air to reach produce in said means for containing, and support engaging means for engaging said produce bin support means in said first chamber.

11. The apparatus of claim 10, wherein said bulk produce bins comprise overhead support means for stacking one of said bins on another without damaging said produce.

12. The apparatus of claim 10, wherein said support engaging means comprises a fork-lift platform.

13. The apparatus of claim 10, wherein a bottom surface of said means for containing comprises slats spaced to contain said produce while allowing passage of air.

14. The apparatus of claim 10, wherein said means for containing comprises a mesh.

15. The apparatus of claim 1, wherein said support means supports all horizontally adjacent produce bins in said first chamber so that said bins are in contact with each other or are sufficiently close to each other so that airflow past said bins passes substantially through said bins rather than between said bins.

16. The apparatus of claim 1, wherein airflow between said produce bins and adjacent walls of said first chamber is substantially reduced by said means for supporting said produce bins when said means for supporting is in contact with said bins.

17. The apparatus of claim 16, wherein said support means supports all horizontally adjacent produce bins in said first chamber so that said bins are in contact with adjacent walls of said first chamber or are sufficiently close to said adjacent walls so that airflow past said bins passes substantially through said bins rather than between said bins and said adjacent walls.

18. The apparatus of claim 1, wherein said first internal chamber is sized to contain two-high, stacked bulk produce bins.

19. The apparatus of claim 18, wherein said apparatus further comprises a further air passage means located in said means for dividing between an upper produce bin and a lower produce bin when said bins are stacked in said first internal chamber.

20. The apparatus of claim 1, wherein said apparatus further comprises access means for introducing said bulk produce bins into said container.

21. The apparatus of claim 20, wherein said access means comprises an entrance door and an exit door for said produce bins located at opposite ends of said first internal chamber.

22. The apparatus of claim 1, wherein said means for supporting comprises a series of transport rollers.

23. The apparatus of claim 1, wherein said means for supporting comprises a conveyer belt.

24. The apparatus of claim 1, wherein said apparatus comprises a plurality of fans connected to a common plenum and a plurality of air passage means for controlling passage of air in said common plenum through a plurality of locations for supporting bulk produce bins.

25. An apparatus for killing insects in produce, which comprises:

an outer container;

means for dividing a space enclosed by said outer container into first and second internal chambers;

means for supporting at least one bulk produce bin in said first internal chamber;

first and second air passage means for allowing passage of air between said first internal chamber and said second internal chamber;

means for circulating air from said second internal chamber successively through one of said air passage means, said first internal chamber, the other of said air passage means, and back into said second internal chamber;

means for heating said circulating air;

access means for introducing said bulk produce bins into said container; and airflow control means for substantially preventing flow of air around said bins adjacent to said access means.

26. The apparatus of claim 25, wherein said means for supporting is capable of conveying a produce bin from said entrance door to said exit door.

27. An apparatus for killing insects in produce, which comprises:

an outer container;

means for dividing a space enclosed by said outer container into first and second internal chambers;

means for supporting at least one bulk produce bin in said first internal chamber;

first and second air passage means for allowing passage of air between said first internal chamber and said second internal chamber;

means for circulating air from said second internal chamber successively through one of said air passage means, said first internal chamber, the other of said air passage means, and back into said second internal chamber;

means for heating said circulating air; and means for spraying water on said produce while said produce is located in said first internal chamber.

28. The apparatus of claim 27, wherein said means for spraying water sprays water either steadily or intermittently.

* * * * *

UNITED STATES PATENT AND TRADEMARK OFFICE
CERTIFICATE OF CORRECTION

PATENT NO. : 5,203,108
DATED      : April 20, 1993
INVENTOR(S): Martin W. Washburn, Jr.

It is certified that error appears in the above-indentified patent and that said Letters Patent is hereby corrected as shown below:

Column 1, line 59, replace "optional" with --optimal--.
Column 3, line 37, replace "A-A" with --2-2--.
Column 3, line 39, replace "B-B" with --3-3--.
Column 5, line 35, replace "A-A" with --2-2--.

Signed and Sealed this

Eighth Day of February, 1994

Attest:

BRUCE LEHMAN

Attesting Officer

Commissioner of Patents and Trademarks

US005203108B1

REEXAMINATION CERTIFICATE (3781st)

United States Patent [19]

Washburn, Jr.

[11] B1 5,203,108
[45] Certificate Issued Jun. 8, 1999

[54] METHOD AND DEVICE FOR HEAT KILLING INSECTS IN BULK PRODUCE CONTAINERS

[76] Inventor: Martin W. Washburn, Jr., R.R. 1, Box 313A, Morgan Hill, Calif. 95037

Reexamination Request:
No. 90/004,439, Oct. 31, 1996

Reexamination Certificate for:
| | |
|---|---|
| Patent No.: | 5,203,108 |
| Issued: | Apr. 20, 1993 |
| Appl. No.: | 08/708,358 |
| Filed: | May 31, 1991 |

Certificate of Correction issued Feb. 8, 1994.

[21] Appl. No.: 07/708,358
[51] Int. Cl.$^6$ ............................................. A01M 19/00
[52] U.S. Cl. ........................... 43/130; 43/124; 43/132.1
[58] Field of Search .......................... 43/124, 130, 132.1

[56] References Cited

U.S. PATENT DOCUMENTS

| | | | |
|---|---|---|---|
| H282 | 6/1987 | Armstrong et al. | 426/615 |
| 4,618,497 | 10/1986 | Couey et al. | 426/233 |

OTHER PUBLICATIONS

Gaffney, J.J., "Warm Air/Vapor Heat Research Facility for Heating Fruits for Insect Quarantine Treatments," ASAE Paper No. 90–6615 (1990).

Sharp, J.L. et al., "Hot–Air Treatment Device for Quarantine Research," *J. Econ. Entomol.* 84(2):520–527 (1991).

Williamson, M.R. et al., "Commercial Scale Heat Treatment for Disinfestation of Papaya," ASAE/CSAE Paper No. 89–6054 (1989).

Armstrong, J.W., "High–Temperature Forced–Air Quarantine Treatments for Fresh Fruits Infested by Tephritid Fruit Flies," *Acta Horticulturae* 269:449–51 (1990).

Gaffney, J.J., "Engineering Principles Related To The Design of Systems for Air Cooling of Fruits and Vegetables in Shipping Containers," *Proceedings Twenty–Ninth Int'l Conf. on Handling Perishable Agricultural Commodities*, Michigan State University (1977).

Gaffney, J.J., et al., "High–Temperature Forced–Air Research Facility for Heating Fruits for Insect Quarantine Treatments," *J. Econ. Entomol.* 83(5):1959–1964 (1990).

Chau, K.V. et al., "Resistance to Air Flow of Oranges in Bulk and in Cartons," *Transactions of the ASAE* 28(6):2083–88 (1985).

Winkelman, P.M. et al., "Advances in Commercial Dry Heat Disinfestation of Papaya," ASAE Paper No. 90–6016 (1990).

Hansen, J.D. et al., "Thermal Death of Oriental Fruit Fly (Diptera: Tephritidae) Third Instars in Developing Quarantine Treatments for Papayas," *J. Econ. Entomol.* 83(1):160–167 (1990).

Armstrong, J.W., "High–Temperature Forced–Air Quarantine Treatment for Papayas," *Proceedings 23rd Annual Hawaii Papaya Industry Assoc. Conf.* pp. 17–20 (1987).

Williamson, M.R. et al., Certification of Fruit Fly Disinfestation Chambers, ASAE Paper No. 91–6569 (1991).

Gaffney, J.J. et al., "Factors Affecting the Costs of Forced–Air Cooling of Fruits and Vegetables," *ASHRAE Journal* 33(1):40–49 (Jan. 1991).

(List continued on next page.)

*Primary Examiner*—Kurt Rowan

[57] ABSTRACT

An apparatus for killing insects in produce, which comprises an outer container; means for dividing a space enclosed by the outer container into first and second internal chambers; means for supporting a plurality of bulk produce bins in the first internal chamber; first and second air passage means for selectively allowing passage of air between the first internal chamber and the second internal chamber; means for circulating air in the second internal chamber successively through one of the air passage means, the first internal chamber, the other of the air passaage means, and back into the second internal chamber; and means for heating the circulating air.

OTHER PUBLICATIONS

Gaffney, J.J., "Engineering Considerations of Heat Transfer in Quarantine Treatments for Fruits," ARS Quarantine Workshop (Nov. 1989).

Gaffney, J.J. et al., "Vapor Heat Research Unit for Insect Quarantine Treatments," *J. Econ. Entomol.* 83(5): 1965–1971 (1990).

Armstrong, J.W. et al., "High–Temperature, Forced–Air Quarantine Treatment for Papayas Infested with Tephritid Fruit Flies (Diptera: Tephritidae)," *J. Econ. Entomol.* 82(6):1667–1674 (1989).

Bennett, A.H., et al., "A Prototype Commercial Forced–Air Precooler," ARS Publication No. 52–9 (1965).

Hood, C.E., "A Forced–Air Precooler for Pickling Cucumbers," *Food Technology* 21(2):86–88 (1967).

Gaffney and Bowman, "An Engineering/Economic Evaluation of Different Concepts for Precooling Citrus Fruits," *ASHRAE Symposium Bulletin SF–4–70*, pp. 25–32 (1970).

Morey and Lang, "Experimental System for Field Cooling of Fresh Produce," *Applied Engineering in Agriculture* 4(3):259–64 (1988).

Baird, C.D. et al., "Research Facility for Forced–Air Precooling of Fruits and Vegetable," *Transactions of the ASAE* 18(2):376–79 (1975).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 27–28 are cancelled.

Claim 1 and 25 are determined to be patentable as amended.

Claims 2–24 and 26, dependent on an amended claim, are determined to be patentable.

New claims 29–30, 31, 32 and 33, 34 are added and determined to be patentable.

1. An apparatus for killing insects in produce, which comprises:
   an outer container;
   means for dividing a space enclosed by said outer container into first and second internal chambers;
   first and second air passage means for allowing passage of air between said first internal chamber and said second internal chamber;
   means for circulating air from said second internal chamber successively through one of said air passage means, said first internal chamber, the other of said air passage means, and back into said second internal chamber;
   means for heating said circulating air while maintaining relative humidity in said first internal chamber below 75%; and
   means for supporting at least one bulk produce bin in said first internal chamber so that sides of said bin contact surfaces of said first internal chamber or surfaces of additional bins in said chamber, wherein contacting surfaces and bin sides block passage of air through said first internal chamber [expect] *except* for passage through said bin or bins in said first internal chamber *thereby causing at least 80% of said air to pass through said bin or bins.*

25. An apparatus for killing insects in produce, which comprises:
   an outer container;
   means for dividing a space enclosed by said outer container into first and second internal chambers;
   means for supporting at least one bulk produce bin in said first internal chamber;
   first and second air passage means for allowing passage of air between said first internal chamber and said second internal chamber;
   means for circulating air from said second internal chamber successively through one of said air passage means, said first internal chamber, the other of said air passage means, and back into said second internal chamber;
   means for heating said circulating air;
   access means for introducing said bulk produce bins into said container; and airflow control means for substantially preventing flow of air around said bins adjacent to said access means *whereby said airflow control means cause at least 80 of said air to pass through said bin or bins.*

*29. The apparatus of claim 1, wherein circulation of air in said apparatus, when loaded to contain produce bins, produces a pressure differential between said first and second air passage means of at least ½ inch of mercury.*

*30. The apparatus of claim 25, wherein circulation of air in said apparatus, when loaded to contain produce bins, produces a pressure differential between said first and second air passage means of at least ½ inch of mercury.*

*31. The apparatus of claim 1, wherein said apparatus is configured to contain and pass air through produce having a depth of at least 2 feet.*

*32. The apparatus of claim 25, wherein said apparatus is configured to contain and pass air through produce having a depth of at least 2 feet.*

*33. The apparatus of claim 1, wherein at least 90 percent of said circulating air passes through said bin or bins rather than around said bin or bins.*

*34. The apparatus of claim 25, wherein at least 90 percent of said circulating air passes through said bin or bins rather than around said bin or bins.*

* * * * *